(12) United States Patent
Affaticati et al.

(10) Patent No.: US 7,382,062 B2
(45) Date of Patent: Jun. 3, 2008

(54) WIDE VOLTAGE RANGE STABILIZED SWITCHING POWER SUPPLY FOR VALVE ACTUATORS

(75) Inventors: Archimede Affaticati, Fiorenzuola D'Arda (PC) (IT); Giuseppe Riboli, Fiorenzuola D'Arda (PC) (IT)

(73) Assignee: Biffi Italia S.R.L., Fiorenzuola D'Arda (PC) (IT)

( * ) Notice: Subject to any disclaimer, the term of this patent is extended or adjusted under 35 U.S.C. 154(b) by 313 days.

(21) Appl. No.: 10/980,426

(22) Filed: Nov. 4, 2004

(65) Prior Publication Data
US 2006/0050459 A1    Mar. 9, 2006

(30) Foreign Application Priority Data
Sep. 3, 2004    (IT) .......................... PR2004A0063

(51) Int. Cl.
*H02J 1/00*    (2006.01)
*H02M 3/335*    (2006.01)

(52) U.S. Cl. ............... 307/28; 323/288; 363/21.03; 363/21.07; 363/21.08; 363/21.09; 363/21.15; 363/21.16; 363/21.17

(58) Field of Classification Search ............... 323/288; 363/21.01, 21.02, 21.03, 21.04, 21.07, 21.08, 363/21.09, 21.15, 21.16, 21.17; 307/28
See application file for complete search history.

(56) References Cited

U.S. PATENT DOCUMENTS

| | | | |
|---|---|---|---|
| 4,628,426 A * | 12/1986 | Steigerwald ................. 363/17 |
| 5,161,097 A | 11/1992 | Ikeda | |
| 5,644,481 A * | 7/1997 | Konishi et al. ........... 363/21.15 |
| 5,777,866 A * | 7/1998 | Jacobs et al. ................ 363/126 |
| 5,929,614 A * | 7/1999 | Copple ........................ 323/222 |
| 6,606,260 B2 * | 8/2003 | Ahlstrom .................... 363/125 |

FOREIGN PATENT DOCUMENTS

| JP | 2-228256 | 9/1990 |
|---|---|---|
| JP | 8-149805 | 6/1996 |

OTHER PUBLICATIONS

"L7800 Series Positive Voltage Regulators," STMicroelectronics, http://www.htmldatasheet.com/stmicroelectronics/l7800series.htm, Feb. 2003 (visted Jul. 20, 2007).*

(Continued)

*Primary Examiner*—Michael Sherry
*Assistant Examiner*—Hal I Kaplan
(74) *Attorney, Agent, or Firm*—Young & Thompson

(57) ABSTRACT

The invention finds application in the field of power supplies for valve actuators, and particularly relates to a wide voltage range stabilized switching power supply for valve actuators, of the type that comprises a filter 2, a diode bridge 3, an array of capacitors 5, an auxiliary power supply stage 6, formed by a switch mode circuit, having an operating range of 21 to 380 VDC, which generates the supply voltages required for the internal operation of the power supply, a full-bridge power stage 7, which receives an input voltage in the range of 120 VDC to 373 VDC, and generates the three stabilized output voltages required for supplying the load, and a boost stage 4, located upstream from the power stage 7, which allows to increase the voltage to a value in the range of 120 VDC to 373 VCC, whenever it is below such range.

2 Claims, 5 Drawing Sheets

OTHER PUBLICATIONS

Hall, "Correct Power Factor in Switched Mode Power Supplies", Electronic Design, vol. 36, No. 24, Oct. 1988, XP000004654, pp. 115-116, 123-124, 126.

Jansen et al., "High Power Density at High Power Levels", Proceedings, 2nd International Conference on Integrated Power Systems, 2002, XP 009035423, pp. 59-63.

* cited by examiner

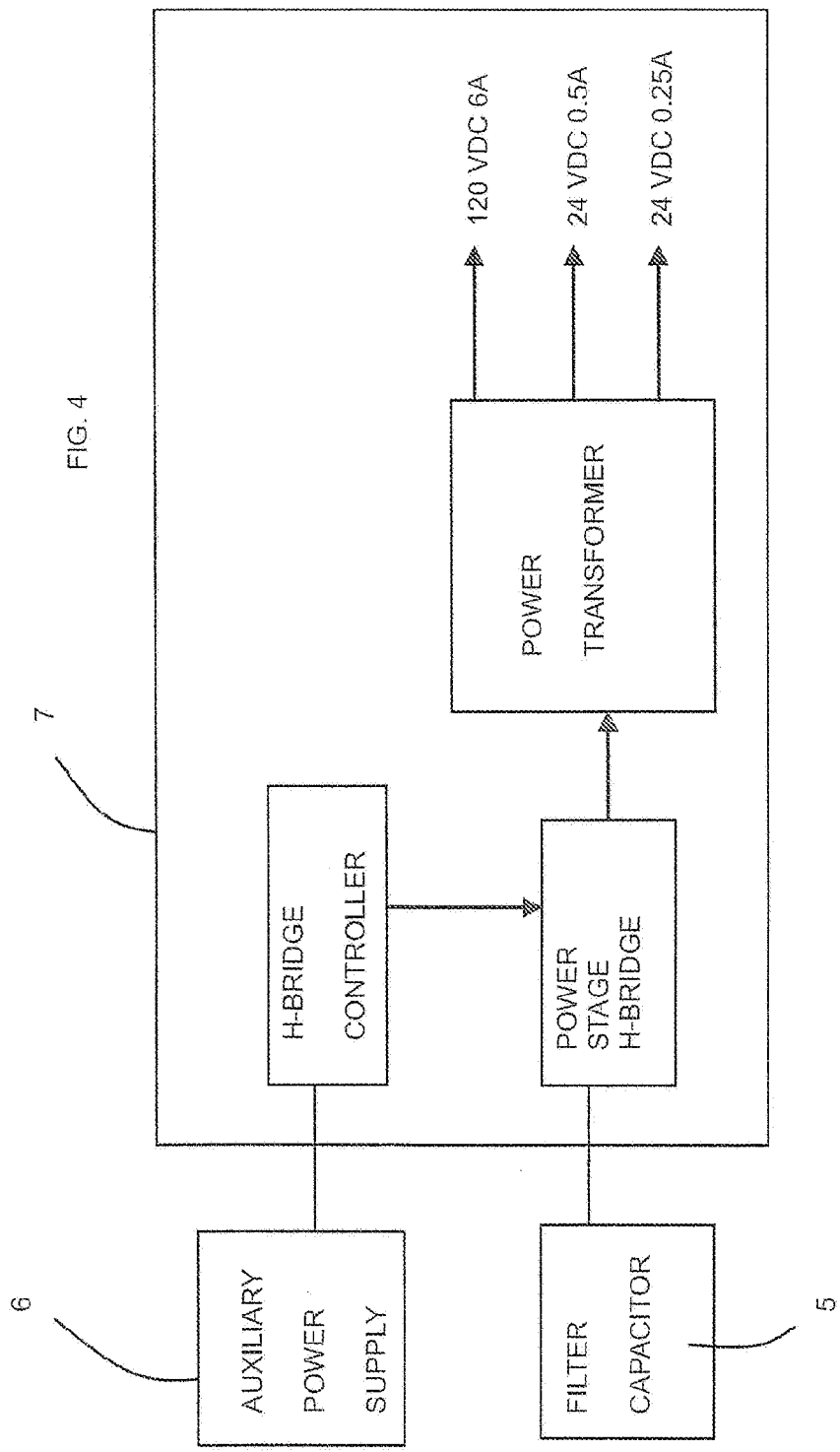

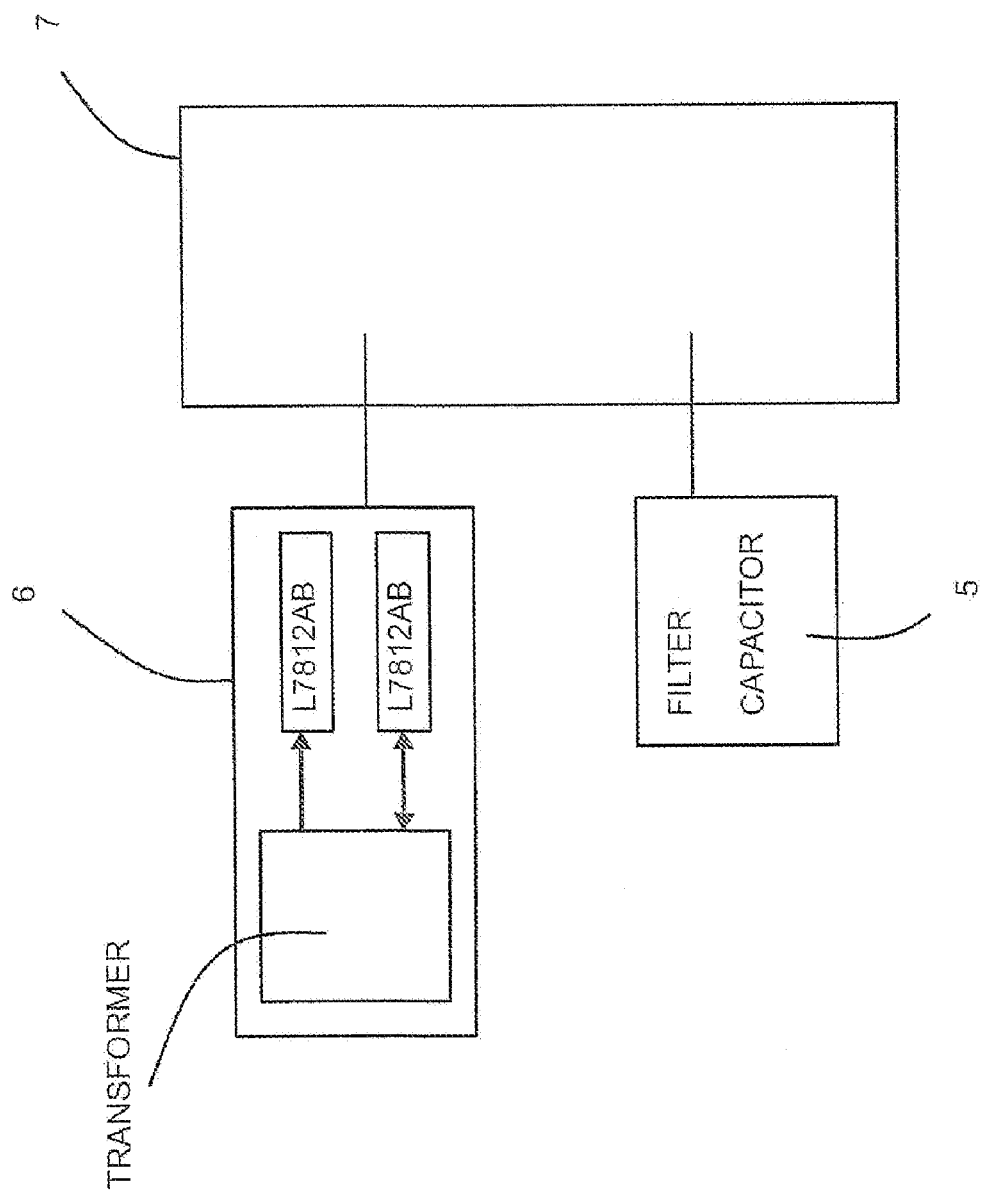

WIDE VOLTAGE RANGE STABILIZED SWITCHING POWER SUPPLY FOR VALVE ACTUATORS

This invention relates to a wide voltage range stabilized switching power supply for valve actuators.

A stabilized switching power supply is a stabilized power supply which uses the switching technique, i.e. a switch mode, for generating a desired voltage.

The switching technique consists in using circuits, particularly transistors, which have a digital ON to OFF switching function at high frequencies, and inductors and transformers that are capable of operating at high frequencies to generate the required voltages.

This technique differs from the conventional technique of linear stabilized power supplies, which use control circuits and transistors having an analog and linear operation.

Switching power supplies are characterized by a high performance and by the use of smaller transformers or inductors as compared with linear power supplies.

Valve actuators are controlled by stepper or asynchronous motors, which are in turn supplied by inverters or static drives, to act on valves, thereby appropriately adjusting the opening, closing and torque thereof.

The use of these motors for valve actuation is particularly suitable for wide voltage range stabilized switching power supplies.

In prior art two or more units are used, which are connected together to increase the permitted voltage range.

Unlike conventional techniques, which use conventional transformers and power supplies, this invention requires no manual switching and no use of secondary windings.

In fact, power supplies often have a number of terminals for connection over several voltage ranges, or alternatively manual voltage switches are used.

The invention is characterized by being very easy to use, as two input terminals and the output power are only provided and automatic voltage switches are embedded in the internal circuit of the power supply.

In other words, the invention is a stabilized switching power supply that is capable of providing a total output power of 740 W in continuous operation, with any input voltage in the range of 24 VAC/DC to 240 VAC.

The permitted variation on voltage rating is ±10%, hence the maximum voltage range is of 21.6 VDC/AC to 264 VAC.

The performance is 70% in the worst operating conditions.

The operating temperature is of −30° C. to +75° C.

When using a DC power supply, wire reversal (+ with −) causes no malfunctioning.

The power supply is used to supply a stepper motor and the associated electronic unit, which are used to control an electric quarter-turn actuator, i.e. a motor-driven actuator, having sets of gears arranged in such a manner that the valve on which the actuator is mounted may follow a 90° path (e.g. a throttle valve).

The output power is divided as follows:
720 W (120V/6 A) to supply the stepper motor;
12 W (24V/0.5 A) to supply the electronic control unit of the quarter-turn actuator;
8 W (24V/0.3 A) to supply the electronic unit of the remote controls of the actuator.

The boost stage upstream from the conventional circuit of a switching power supply allows increases the voltage if the voltage is below a predetermined minimum range.

In practice, the inventive power supply always operates in a voltage range of 120 to 370 Volts.

The object of this invention is to handle wide voltage ranges with a single power supply without using multiple successive power supplies, thereby simplifying the use of the invention, as two input terminals and one output power are only provided.

These objects and advantages are achieved by the wide voltage range stabilized switching power supply for valve actuators of this invention, which is characterized by the annexed claims.

These and other characteristics will be more apparent from the following description of a few embodiments, which are shown by way of example and without limitation in the accompanying drawings, in which:

FIG. 4 is a schematic illustration of the power stage; and

FIG. 5 is a schematic illustration of the auxiliary power supply.

Figure 1:
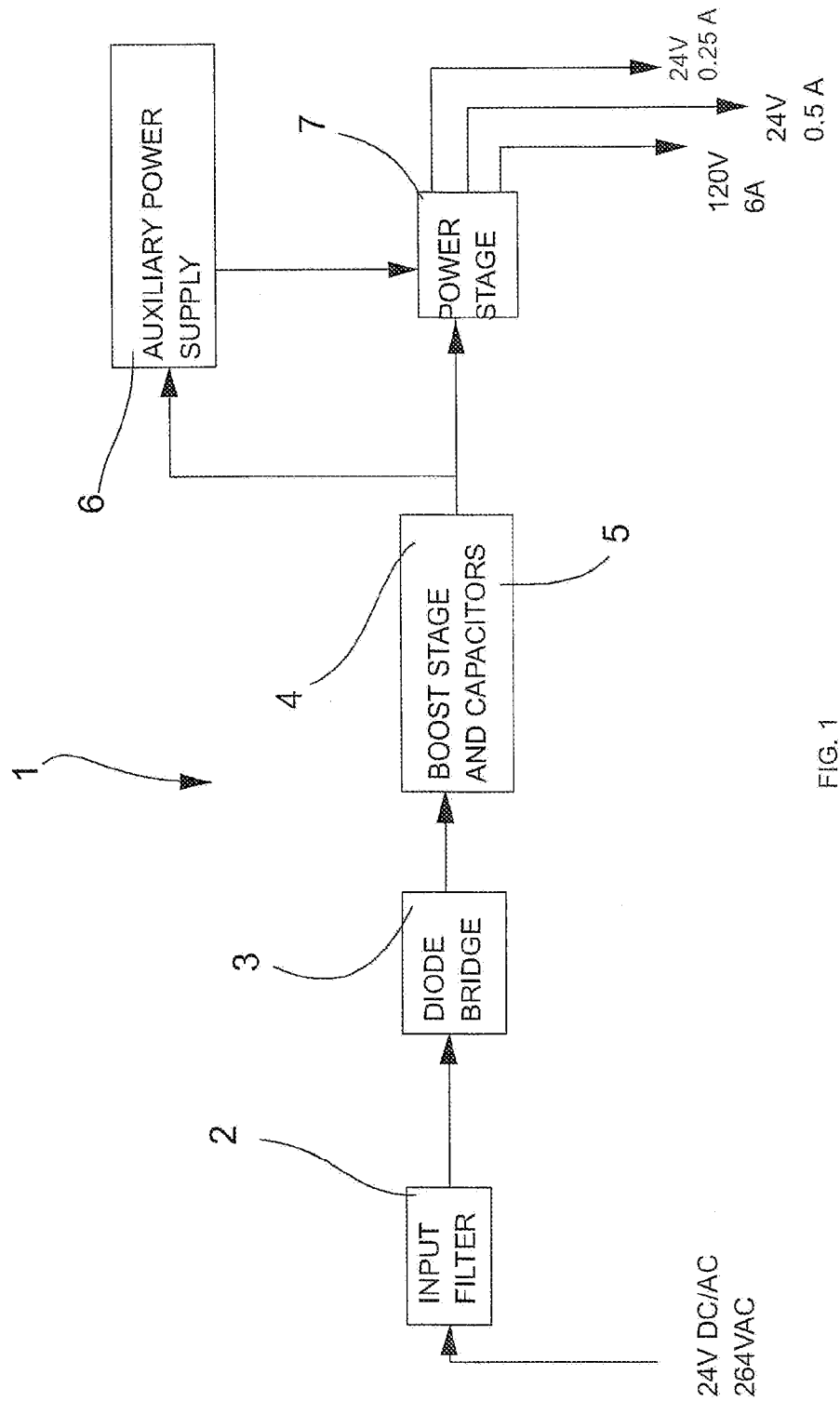
FIG. 1 is a block diagram of the inventive power supply.
Figure 2:
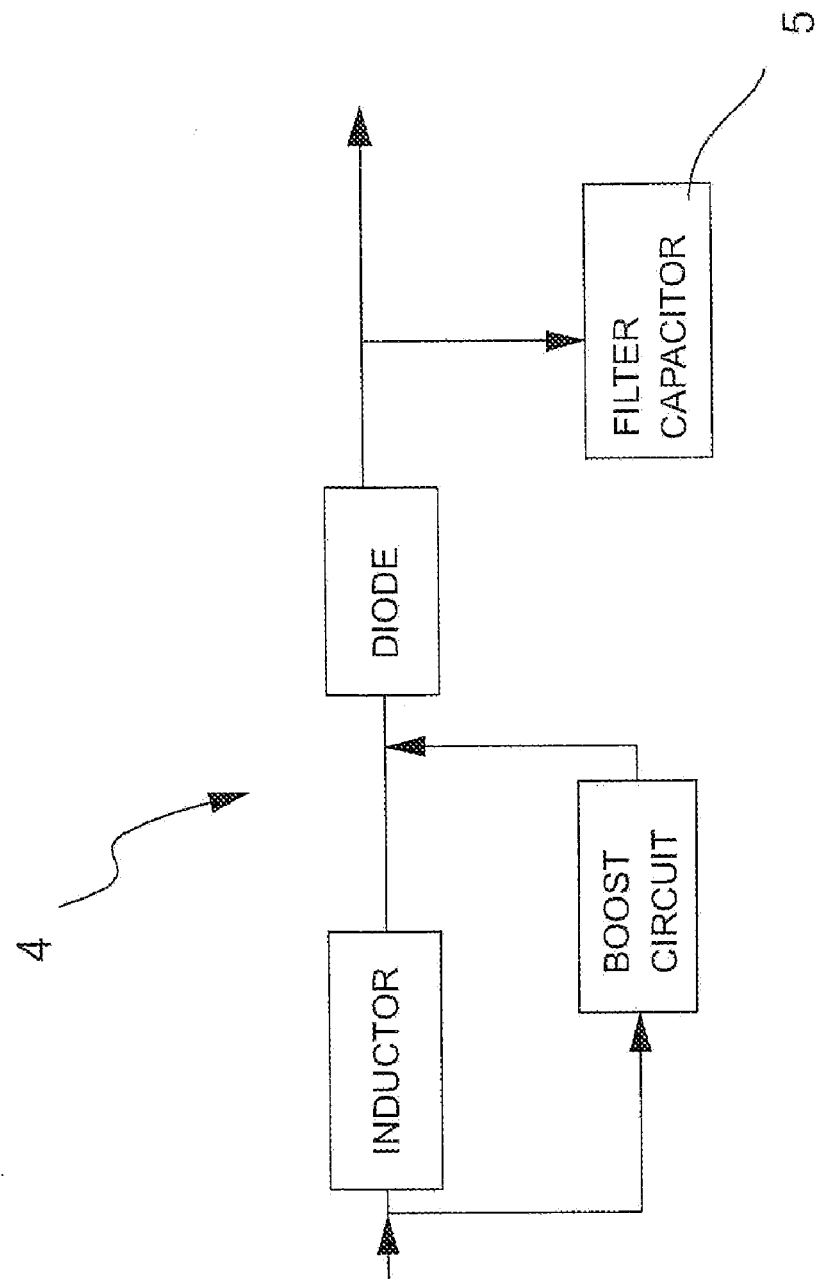
FIG. 2 is a detailed view of the boost stage and the capacitors.
Figure 3:
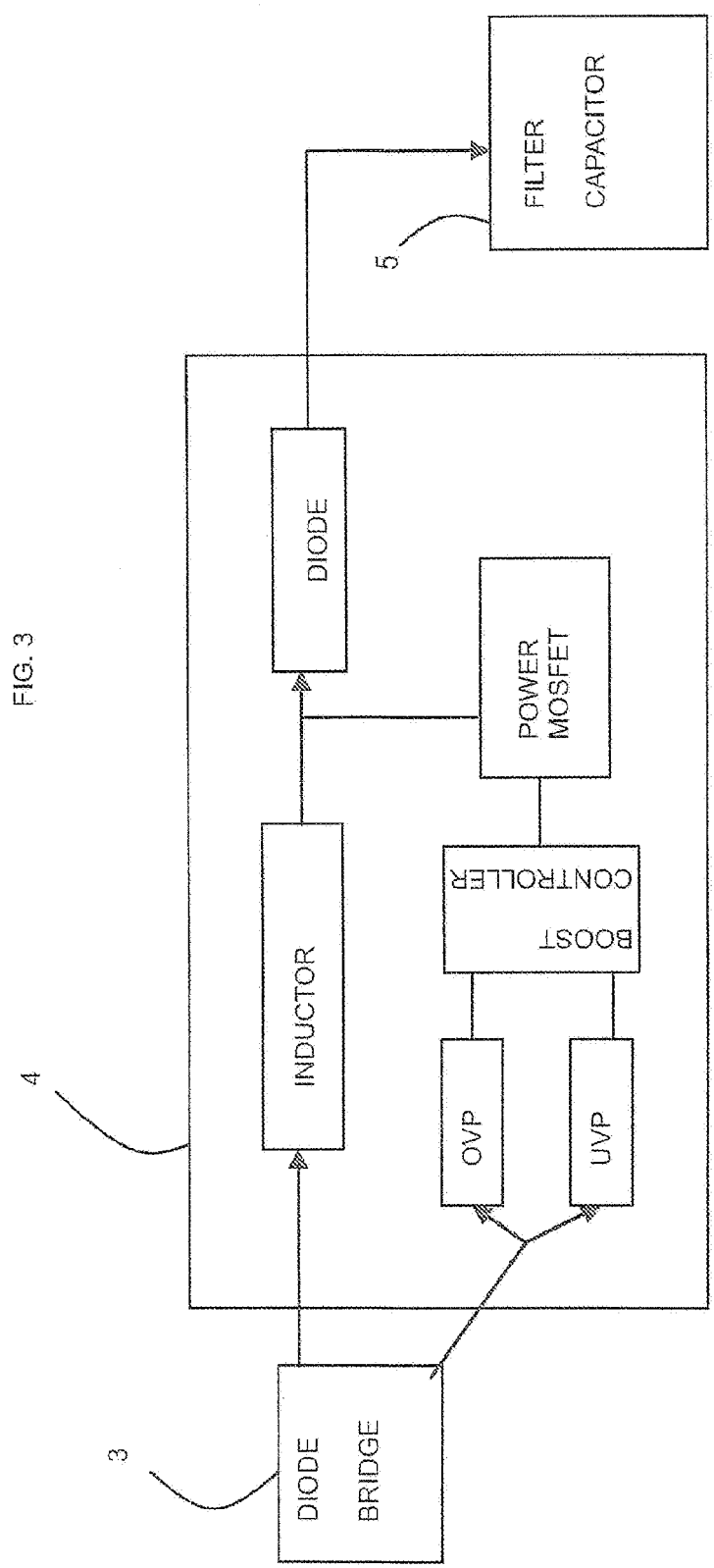
FIG. 3 is a schematic illustration of the boost stage.

Referring to FIGS. 1 and 2, 1 generally designates the scheme of a wide voltage range stabilized switching power supply for valve actuators, which is composed of a common mode input filter 2 (for removing common mode noise, i.e. the noise which is simultaneously present in phase at both input wires of the filter), a diode bridge 3 rectifier, a boost stage 4 and voltage equalizing capacitors 5, an auxiliary power supply stage 6 and finally a power stage 7.

The filter 2 has an inductive value sufficient to attenuate high supply voltage emissions and, at the same time, the DC resistance is minimized to limit the dissipated power and, as a result, the heat and the minimum admitted DC input voltage.

The diode bridge 3 rectifier is used to rectify the alternating-current input voltage and to protect the input against polarity reversal in case of direct-current voltage. The diode bridge 3 has a maximum operating voltage of 600 VDC.

The heaviest operating condition from a thermal point of view corresponds to 24 VDC-10%, i.e. the minimum operating voltage and the maximum current.

The input boost stage 4 can operate in two modes:
a low range mode, operating in the input voltage range of 21.6 VDC to 120 VDC (90 VAC);
a high range mode, operating in the range of input voltages above 120 VDC (90 VAC).

In low range mode, the boost stage 4 increases the input voltage (varying in the range of 21.6 VDC to 120 VDC (90 VAC)) to the constant value of 120 VDC, which in turn provides the supply to the full bridge circuit (i.e. the power stage 7).

The boost stage also acts as a Power Factor Corrector (PFC), to reduce the reactive power and has a performance of more than 90%.

In high range mode, the boost stage 4 is automatically shunted by an overvoltage measuring circuit, in which case the power stage 7 operates at the rectified input voltage (from 120 VDC (90 VAC) to 372 VDC (264 VAC)).

Six 560 microF/400 V equalizing capacitors connected in parallel are provided for a total of 3360 microF (microfarad) for equalizing the rectified alternating-current voltage.

Due to the high ripple current value and the high ambient temperature, capacitors 5 are selected which have low loss and high operating temperature features.

Ripple current is known from the art to be an alternating current superimposed to a direct current flowing in the capacitors used for voltage equalization.

The most difficult condition for capacitors 5 is represented by the lowest voltage conditions both in low and high voltage ranges.

The downstream auxiliary power supply stage 6 is a switch mode circuit with an operating range of 21 to 380 VDC, which generates the supply voltages required for the internal operation of the power supply.

Finally, the power stage 7 is provided with a H bridge module with a transformer, i.e. a set of circuits which supply the switching transformer from whose secondary winding provides the voltages required to supply the load.

The power stage 7 is of the full bridge type, i.e. formed by four MOSFET transistors and a controller to control the ON and OFF states of the latter.

A MOSFET is a metal oxide semiconductor field effect transistor, operating with a MOS technology.

Since it is a transistor, it has three terminals: the Gate (a control terminal corresponding to the Base terminal of two-pole transistors), a Drain and a Source.

The power stage 7 receives an input voltage varying in the range of 120 VDC to 373 VDC and generates the three stabilized output voltages required for supplying the load.

The MOSFET drive, i.e. the control circuit of the 4 MOSFET transistors) is a transformer, shared by the four MOSFETs, to reset the average fluctuation of the Gate terminal driving voltage, i.e. the voltage required to control the ON and OFF states of the transistors, as the ON time of the transistor, i.e. Ton, changes.

The 120 VDC voltage is stabilized, as it is used as a feedback in the power stage.

The 24 VDC/0.5 A voltage is not stabilized as it is taken as an intermediate tap point of the 120 VDC voltage.

The 24 VDC/0.25 A voltage, isolated at 2 KV is stabilized by a low voltage linear regulator of the L 7824 type, a linear voltage regulator manufactured by STMicroelectronic or similar.

The invention claimed is:

1. A wide voltage range stabilized switching power supply for valve actuators of the type comprising:
   a common mode input filter (2) for removing common mode noise;
   a diode bridge (3) rectifier producing a rectified voltage;
   a boost stage (4) generating a boost stage voltage, the boost stage being located upstream from a power stage (7) and voltage equalizing capacitors (5) connected in parallel, for equalizing the rectified voltage; and
   an auxiliary power supply stage (6) formed by a switch mode circuit with an operating range of 21 to 380 VDC, which generates supply voltages required for internal operation of the power supply; and
   a power stage (7) that receives the boost stage voltage varying in the range of 120 VDC to 373 VDC and generates the output voltages required for supplying a load;
   characterized in that the boost stage (4) also acts as a Power Factor Corrector (PFC), to reduce reactive power and has an efficiency of more than 90%; and
   characterized in that said boost stage (4) can operate in two modes:
      a low range mode, operating in the input voltage range of 21.6 VDC to 120 VDC (90 VAC);
      a high range mode, operating in the range of input voltages above 120 VDC (90 VAC);
   in the low range mode, the boost stage 4 increases the input voltage, varying in the range of 21.6 VDC to 120 VDC (90 VAC), to the constant value of 120 VDC, which in turn provides the supply to the full bridge circuit of the power stage (7); and
   in the high range mode, the boost stage (4) is automatically shunted by an overvoltage measuring circuit, in which case the power stage (7) operates at the rectified voltage (from 120 VDC (90 VAC) to 372 VDC (264 VAC)).

2. A wide voltage range stabilized switching power supply for valve actuators of the type comprising:
   a common mode input filter (2) for removing common mode noise;
   a diode bridge (3) rectifier producing a rectified voltage;
   a boost stage (4) generating a boost stage voltage, the boost stage being located upstream from a power stage (7) and voltage equalizing capacitors (5) connected in parallel, for equalizing the rectified voltage; and
   an auxiliary power supply stage (6) formed by a switch mode circuit with an operating range of 21 to 380 VDC, which generates supply voltages required for internal operation of the power supply; and
   a power stage (7) that receives the boost stage voltage varying in the range of 120 VDC to 373 VDC and generates the output voltages required for supplying a load;
   characterized in that the boost stage (4) also acts as a Power Factor Corrector (PFC), to reduce reactive power and has an efficiency of more than 90%; and
   wherein said input boost stage (4) is constructed and arranged so as to operate in two modes:
      a low range mode, in which the input boost stage operates when the voltage received from the diode bridge rectifier is in a range of 21.6 VDC to 120 VDC (90 VAC); and
      a high range mode, in which the input boost stage operates when the voltage received from the diode bridge rectifier is in a range above 120 VDC (90 VAC);
   wherein in low range mode, the boost stage increases the voltage received from the diode bridge rectifier that varies in the range of 21.6 VDC to 120 VDC (90 VAC), to a constant value of 120 VDC provided to the full bridge circuit of the power stage (7); and
   wherein in high range mode, the boost stage (4) is constructed and arranged so as automatically to be shunted by an overvoltage measuring circuit, in which case the power stage (7) operates at the voltage produced by the diode bridge rectifier.

* * * * *